US009942951B2

(12) United States Patent
Bilet et al.

(10) Patent No.: US 9,942,951 B2
(45) Date of Patent: Apr. 10, 2018

(54) MICROWAVE HEATING ELEMENT

(71) Applicant: Elwha LLC, Bellevue, WA (US)

(72) Inventors: Maxime J. J. Bilet, Seattle, WA (US); Roderick A. Hyde, Redmond, WA (US); Muriel Y. Ishikawa, Livermore, CA (US); Jordin T. Kare, Seattle, WA (US); Nathan P. Myhrvold, Medina, WA (US); Nels R. Peterson, Bellevue, WA (US); Clarence T. Tegreene, Mercer Island, WA (US); Lowell L. Wood, Jr., Bellevue, WA (US); Victoria Y. H. Wood, Livermore, CA (US); Christopher C. Young, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 433 days.

(21) Appl. No.: 14/550,587

(22) Filed: Nov. 21, 2014

(65) Prior Publication Data

US 2016/0150602 A1 May 26, 2016

(51) Int. Cl.

| | |
|---|---|
| ***H05B 6/70*** | (2006.01) |
| ***H05B 6/68*** | (2006.01) |
| ***H05B 6/64*** | (2006.01) |
| ***G01K 7/34*** | (2006.01) |
| ***B65D 81/34*** | (2006.01) |

(52) U.S. Cl.

CPC ......... *H05B 6/705* (2013.01); *B65D 81/3453* (2013.01); *H05B 6/6452* (2013.01); *H05B 6/70* (2013.01); *B65D 2581/342* (2013.01); *B65D 2581/3416* (2013.01); *B65D 2581/3427* (2013.01); *B65D 2581/3471* (2013.01)

(58) Field of Classification Search

CPC ........ H05B 6/705; H05B 6/70; H05B 6/6452; B65D 81/3453; B65D 2581/3471; B65D 2581/342; B65D 2581/3427; B65D 2581/3416

USPC ....... 219/712, 713, 704, 728, 730, 725, 748, 219/749, 687; 374/117, 118, 119, 120, 374/121, 141, 149, 155, 152, 163, 183, 374/208; 343/720, 873

See application file for complete search history.

(56) References Cited

U.S. PATENT DOCUMENTS

| | | | | |
|---|---|---|---|---|
| 4,144,435 | A | 3/1979 | Clark et al. | |
| 4,416,907 | A | 11/1983 | Watkins | |
| 4,460,814 | A | 7/1984 | Diesch et al. | |
| 4,475,024 | A * | 10/1984 | Tateda | G01K 1/024 219/713 |
| 5,493,102 | A | 2/1996 | Takase et al. | |
| 5,582,854 | A | 12/1996 | Nosaka et al. | |
| 5,977,531 | A | 11/1999 | Pfister et al. | |

(Continued)

*Primary Examiner* — Quang Van

(74) *Attorney, Agent, or Firm* — Foley & Lardner LLP

(57) ABSTRACT

A microwave heating element includes a microwave antenna configured to absorb power from a microwave field in a microwave oven, a housing having a first end coupled to the microwave antenna and a second end configured to be inserted into an item to be heated, and a transmission line positioned within the housing, the transmission line having an end coupled to the microwave antenna. The transmission line is configured to spatially distribute the power absorbed from the microwave field into the item to be heated at a location between the first end and the second end of the housing.

4 Claims, 5 Drawing Sheets

(56) References Cited

U.S. PATENT DOCUMENTS 8,398,303 B2 * 3/2013 Kuhn .................... G01K 1/024
219/712

* cited by examiner

MICROWAVE HEATING ELEMENT

BACKGROUND

Microwave ovens use microwaves to defrost, heat, dry, or cook various items. Such items may include frozen meats, casseroles, and vegetables, among other types of microwavable foods. Microwave ovens may also be used to heat other materials (e.g., wax, water, etc.) as part of industrial or non-industrial processes. Microwave ovens operate by generating microwaves (e.g., with a magnetron, etc.) and directing the microwaves (e.g., with a waveguide, etc.) toward the product. The microwaves penetrate the product to a skin depth, which may cause uneven heating (e.g., the middle of the product may receive less power than an outer portion of the product, thereby leaving the middle undercooked, etc.). Despite this deficiency, microwave ovens are commonly used in both residential and commercial applications to defrost, heat, dry, or cook various items.

SUMMARY

One embodiment relates to a microwave heating element including a microwave antenna configured to absorb power from a microwave field in a microwave oven, a housing having a first end coupled to the microwave antenna and a second end configured to be inserted into an item to be heated, and a transmission line positioned within the housing, the transmission line having an end coupled to the microwave antenna. The transmission line is configured to spatially distribute the power absorbed from the microwave field into the item to be heated at a location between the first end and the second end of the housing.

Another embodiment relates to a microwave heating element that includes a microwave antenna configured to absorb power from a microwave field in a microwave oven, a sensor positioned to detect a property of an item to be heated, and a transmission line having an end coupled to the microwave antenna. The transmission line is configured to distribute the power absorbed from the microwave field into the item to be heated based on the property of the item to be heated.

Still another embodiment relates to a packaging assembly that includes a container and a microwave heating element. The container includes a plurality of sidewalls and is configured to receive an item to be heated therein. The microwave heating element is coupled to the container and configured to be positioned at least partially within the item to be heated. The microwave heating element includes a microwave antenna configured to absorb power from a microwave field in a microwave oven and a transmission line having an end coupled to the microwave antenna. The transmission line is configured to spatially distribute the power from the microwave field into the item to be heated during operation of the microwave oven.

Yet another embodiment relates to a microwave cooking system that includes a plurality of walls defining an inner cavity configured to receive an item to be heated therein, a microwave source configured to produce microwaves at a first frequency and a second frequency, and a microwave heating element positioned within the inner cavity. The microwave heating element includes a microwave antenna tuned to absorb power from the microwaves at the first frequency and a transmission line having an end coupled to the microwave antenna. The transmission line is configured to spatially distribute the power of the microwaves at the first frequency into the item to be heated.

Another embodiment relates to a method of manufacturing a microwave heating element that includes providing a microwave antenna configured to absorb power from a microwave field in a microwave oven, coupling a first end of a housing to the microwave antenna, and positioning a transmission line within the housing. The transmission line has an end coupled to the microwave antenna and is configured to spatially distribute the power from the microwave field into an item to be heated at a location between the first end and a second end of the housing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Figure 1:
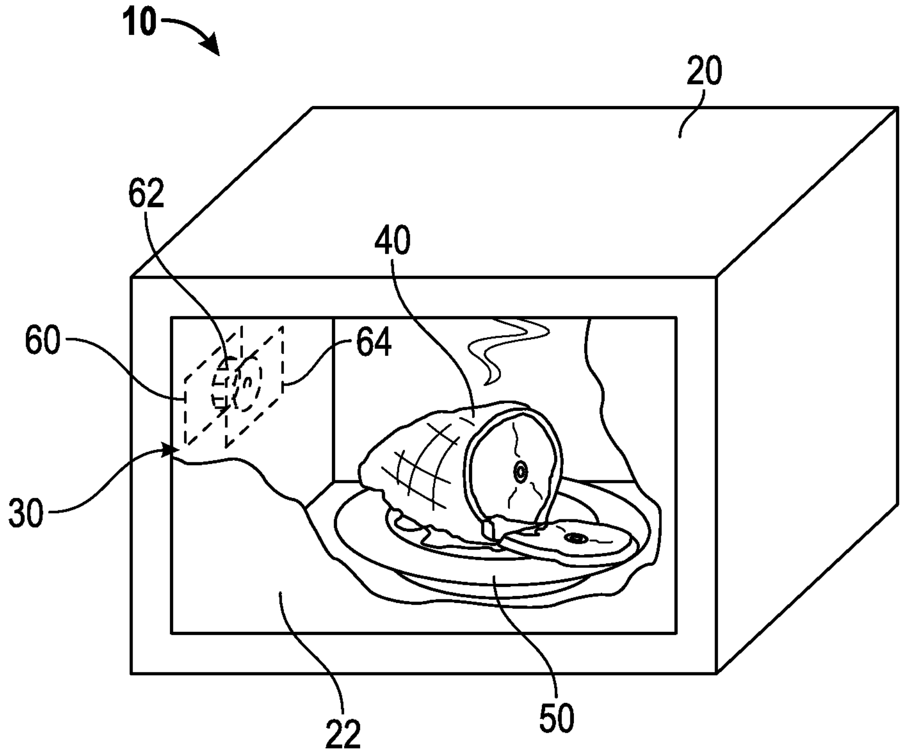
FIG. 1 is an isometric view of a microwave heating system, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, a microwave heating system, shown as microwave oven 10, includes a plurality of sidewalls 20 and a door 22. Sidewalls 20 and door 22 may be manufactured from steel or other suitable materials and may be coated (e.g., painted). As shown in FIG. 1, sidewalls 20 are rectangular and formed from a plurality of sheets. As shown in FIG. 1, sidewalls 20 and door 22 are positioned to form an inner cavity 30. Inner cavity 30 may have the shape of a rectangular box or may have another shape (e.g., spherical, oblong, etc.). In other embodiments, the microwave heating system includes walls that define an opening through which an item to be heated may pass (e.g., on a conveyor, etc.).

Referring still to FIG. 1, an item to be heated, shown as food product 40, is positioned within inner cavity 30 along with a support, shown as tray 50. An actuator (e.g., a motor, etc.) may move tray 50 relative to microwave oven 10. By way of example, a motor may rotate tray 50 thereby providing a turntable upon which food product 40 is placed. The actuator may increase the uniformity with which food product 40 is heated. Food product 40 may be positioned on tray 50, may be positioned on at least one of the sidewalls 20, or may be positioned on a conveyer and moved through inner cavity 30. As shown in FIG. 1, food product 40 is a ham. Food product 40 may alternatively be another type of food (e.g., a chicken breast, a turkey, a casserole, a squash, etc.). In other embodiments, the item to be heated includes still another material (e.g., wax, powers, paint particles, water, etc.).

Microwave oven 10 includes a microwave source, shown as microwave source 60, that produces a microwave field. A stirrer (e.g., paddle wheel, etc.), shown as stirrer 62, is positioned to promote uniform distribution of microwaves (e.g., reduce the prevalence of standing waves within inner cavity 30, etc.). Grill 64 may partially cover an aperture defined in microwave oven 10 to expose stirrer 62 and microwave source 60 to inner cavity 30. Microwave source 60 may include a magnetron that is coupled to inner cavity 30 (e.g., via grill 64, etc.). Microwave source 60 may include a single source of microwave radiation or may include a plurality of sources (e.g., a single magnetron or a plurality of magnetrons, etc.). As shown in FIG. 1, microwave source 60 is coupled to sidewall 20 and positioned along inner cavity 30, though microwave source 60 may be coupled to inner cavity 30 with a waveguide (i.e., microwave source 60 may be remotely positioned, etc.). Microwave source 60 is configured to produce a microwave field at a specified frequency. The specified frequency may be a particular frequency (e.g., 915 MHz, 2.45 GHz, etc.) or a range of frequencies (e.g., a frequency band centered at 915 MHz, 2.45 GHz, etc.). Although in principal any frequency could be used, spectrum regulations relating to microwave interference define particular frequency bands designated for use in microwave oven applications. Microwave energy from microwave source 60 produces a microwave field in cavity 30. Microwave power is absorbed from this field by the materials making up food product 40, resulting in heating of the materials. Because the materials in the outer portions of food product 40 absorb a portion of the microwave field, the inner portions of food product 40 experience a lower field strength and therefore tend to absorb less power per unit of mass or volume than the outer portions. The inner portions may therefore be heated less, resulting in uneven temperatures and/or non-uniform processing within food product 40 (e.g., during a cooking process, during a melting process, during a process including one or more chemical reactions, etc.). In some cases, essentially all of the microwave field is absorbed before reaching the center of food product 40 such that the center portion is heated only indirectly (e.g., via conduction, convection, or thermal radiation from the outer portions of food product 40). Such interaction may unevenly increase the temperature of food product 40. By way of example, food product 40 may include a large turkey that remains undercooked or under-thawed when subjected to a cooking or defrost process in microwave oven 10. By way of another example, another item to be heated (e.g., a volume of paint particles, etc.) may maintain elevated moisture levels in middle portions thereof relative to outer portions when subjected to a drying process in a traditional microwave system.

Figure 2:
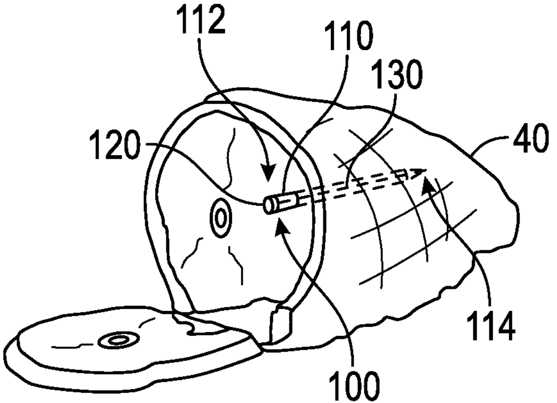
FIG. 2 is an isometric view of a microwave heating element positioned within an item to be heated, according to one embodiment.

Referring next to the embodiment shown in FIG. 2, a microwave heating element, shown as microwave spike 100, is inserted into food product 40. Microwave spike 100 may be used to heat, cook, melt, dry, or otherwise process various materials. By way of example, microwave spike 100 may be used to heat food products. By way of another example, microwave spike 100 may be used to melt wax as part of an industrial process. By way of still another example, microwave spike 100 may be used to dry a powered material (e.g., paint particles, etc.). By way of yet another example, microwave spike 100 may be used as part of a composite manufacturing process.

The combination of food product 40 and microwave spike 100 may be positioned within microwave oven 10. Microwave spike 100 is intended to increase the transfer of microwave power into the interior of food product 40. By way of example, microwave spike 100 may be inserted into food product 40 to increase the power transfer into the center portion of food product 40. As shown in FIG. 2, microwave spike 100 includes a housing, shown as body 110, having a first end 112 and a second end 114. Body 110 includes a central portion having a uniform cross-sectional shape that tapers to a tip (e.g., a point, etc.) at second end 114, according to the embodiment shown in FIG. 2. The tip may be sharpened to facilitate insertion of microwave spike 100 into food product 40. In other embodiments, body 110 has a circular cross-sectional shape and has a diameter that tapers between first end 112 and second end 114. In still other embodiments, body 110 has a rectangular (e.g., square, etc.) or other cross-sectional shape. Body 110 may extend linearly in a straight line, or body 110 may be curved, according to various embodiments.

Body 110 may have other physical features to facilitate use thereof. In one embodiment, body 110 includes a handle attached at first end 112 of body 110 to facilitate inserting or removing microwave spike 100. In other embodiments, body 110 includes a barb, clip, or other feature to aid in securing body 110 within food product 40. In still other embodiments, body 110 includes a collar or flange to limit the depth of insertion into food product 40. Body 110 may be rigid and self-supporting such that microwave spike 100 may be directly inserted into food product 40 without using additional tools or components. In other embodiments, microwave spike 100 is a micro-strip wave guide including metal foil on a cardboard backing. Microwave spike 100 may be inserted with a tool (e.g., a pair if tweezers, etc.), and the tool may be removed to leave the cardboard behind. Microwave spike 100 may be disposable, and the tool may be intended for reuse. By way of example, microwave spike 100 may be plastic and inserted with a metal rod thereby reducing the cost of replacing microwave spike 100 (e.g., daily, etc.).

According to one embodiment, the microwave heating element (e.g., microwave spike 100, etc.) is disposable. At least a portion of the microwave heating elements may be discarded after a limited number of uses (e.g., the microwave heating element may be intended for single-use, etc.). In one embodiment, the microwave heating element is manufactured using a disposable material or combination of materials. The microwave heating element may be rigid or flexible. In one embodiment, the microwave heating element is flexible and configured to be inserted into the item to be heated with a tool. By way of example, the microwave heating element may have a flange, lip, projection, or other structure that interfaces with a portion of the tool to facilitate insertion. In one embodiment, the microwave heating element has a cylindrical shape, and the tool defines a corresponding internal void configured to receive the microwave heating element. The tool and the microwave heating element may be selectively coupled (e.g., using a twist-lock connection, by way of a friction fit, etc.) such that the tool and the microwave heating element may be inserted together into the item to be heated. The tool may be released from the microwave heating element and removed from the item to be heated. The tool may be intended for reuse or may be manufactured from disposable materials and intended to be discarded. The tool may reduce the cost of manufacturing the microwave heating element by facilitating manufacture thereof using cardboard or other low-cost materials. The tool may improve the amount of heating or the efficiency of the microwave heating element by removing various structural components (e.g., those portions of the microwave heating element that are rigid to facilitate insertion, etc.) that may otherwise interfere with the radiative or conductive power transfer into the item to be heated.

As shown in FIGS. 2-11, microwave spike 100 includes a microwave antenna, shown as microwave antenna 120. According to one embodiment, the impedance of microwave antenna 120 corresponds to the impedance of the medium surrounding food product 40 (e.g., air, water, etc.). Microwave antenna 120 may be tuned to absorb power from the microwave field present in inner cavity 30. By way of example, microwave antenna 120 may have a resonant element (e.g., cavity, circuit, etc.) that provides frequency selectivity. In on embodiment, microwave antenna 120 absorbs power from the entire microwave frequency band. In other embodiments, microwave antenna 120 is tuned to absorb power from only a subset of the microwaves of the microwave field. The subset of microwaves may have a frequency band that is narrower than frequency band of the microwaves produced by the microwave oven. While shown as disk-shaped in FIG. 2, microwave antenna 120 may be otherwise shaped (e.g., pointed, hemispherical, etc.), according to various embodiments. In one embodiment, microwave antenna 120 has a cross-section that facilitates absorption (e.g., a dipole, a quarter wave monopole, an array, a patch antenna, etc.). Microwave antenna 120 may be physically coupled to first end 112 of body 110. Second end 114 of body 110 is configured to be inserted into food product 40, according to one embodiment.

According to the embodiment shown in FIGS. 2-11, microwave spike 100 has a transmission line, shown as transmission line 130. Transmission line 130 may be positioned within body 110 and may include an end 132 that is coupled to microwave antenna 120. In some embodiments, transmission line 130 is formed between an inner conductor and an outer sidewall of body 110. A dielectric material may be disposed between the inner conductor and outer sidewall of body 110. In other embodiments, transmission line 130 is a coaxial cable extending through body 110. According to still another embodiment, transmission line 130 is a strip-line. In yet other embodiments, transmission line 130 is a hollow or dielectric-filled waveguide. At least one of body 110 and the transmission line may include a window or radiator (e.g., a patch radiator, etc.) configured to facilitate the transmission of microwave power from the waveguide into the item to be heated. In one embodiment, a dielectric material is disposed within the window, thereby preventing the item to be heated (e.g., food product, paint particles, etc.) from entering body 110 or transmission line 130.

As shown in FIGS. 2-11, microwave antenna 120 is positioned at an end of body 110. According to another embodiment, microwave antenna 120 is spaced from an end of body 110. In one embodiment, an extension containing a transmission line (e.g., a cardboard and foil structure, etc.) couples the spaced microwave antenna 120 with transmission line 130. The extension may be rigid or flexible. In other embodiments, transmission line 130 projects from an end of body 110 and is coupled to the spaced microwave antenna 120. In one embodiment, microwave spike 100 having microwave antenna 120 spaced from an end of body 110 facilitates spacing microwave antenna 120 from a surface of the item to be heated. By way of example, the microwave antenna 120 may be disposed along a wall of a container associated with the item to be heated and coupled with the extension to at least one of body 110 and transmission line 130. The item to be heated containing body 110 may thereby be spaced from the walls of the container. Microwave spike 100 having a spaced microwave antenna 120 may reduce "shadowing" (e.g., reduced or increased heating of part of the surface of the item being heated due to interaction of an adjacent antenna with the microwave field, etc.) and thereby reduce the risk of under- or over-processing the item to be heated.

In one embodiment, transmission line 130 is integral to body 110 (e.g., body 110 may form a waveguide or outer shell of a coaxial line, etc.). In other embodiments, transmission line 130 is a separate component that is coupled to body 110. As shown in FIG. 2, at least a portion of body 110 and transmission line 130 extend into an inner volume of food product 40 when microwave spike 100 is inserted into food product 40. While shown in FIG. 2 as a straight line, it should be understood that transmission line 130 may otherwise extend through body 110 along microwave spike 100 (e.g., may be coiled, curved, etc.).

Figure 3:
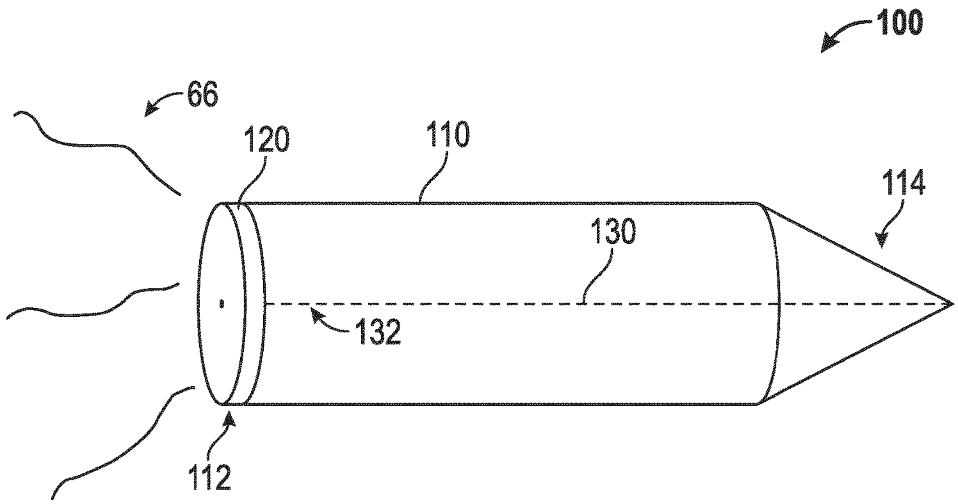
FIG. 3 is an elevation view of a microwave heating element, according to one embodiment.

Referring next to the embodiment shown in FIG. 3, activation of a microwave oven produces an incident microwave field 66. Incident microwave field 66 may have a particular frequency (e.g., 915 MHz, 2.45 GHz, etc.). In other embodiments, incident microwave field 66 has different frequencies within a frequency band that is centered at a particular frequency (e.g., 915 MHz, 2.45 GHz, etc.). Regardless of frequency, incident microwave field 66 carries microwave power. During operation of the microwave oven, microwave antenna 120 transfers microwave power from the microwave field 66 into transmission line 130.

Figure 4:
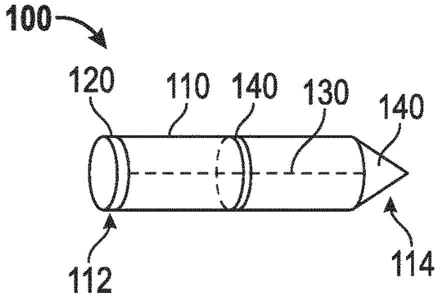
FIG. 4 is an elevation view of a microwave heating element having a radiator heating component, according to one embodiment.
Figure 5:
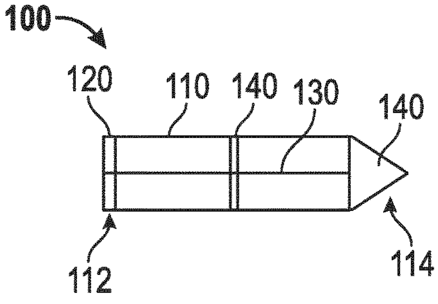
FIG. 5 is a sectional view of a microwave heating element having a radiator heating component, according to one embodiment.

Referring next to the embodiment shown in FIGS. 4-5, microwave spike 100 includes a heating component, shown as reradiating antenna 140, coupled to transmission line 130. Power absorbed by microwave antenna 120 and conveyed along transmission line 130 is transferred into an item to be heated by reradiating antenna 140, according to one embodiment. As shown in FIGS. 4-5, microwave spike 100 includes one reradiating antenna 140 positioned at second end 114 of body 110 and one reradiating antenna 140 positioned between first end 112 and second end 114 of body 110. In some embodiments, microwave spike 100 includes more than two reradiating antennas 140. In other embodiments, microwave spike 100 includes fewer than two reradiating antennas 140 (e.g., a single heating component positioned between first end 112 and second end 114 of body 110, a single heating component positioned at second end 114 of body 100, etc.). Reradiating antennas 140 may have the same or different widths. In some embodiments, a single reradiating antenna 140 may extend along the entire length of body 110 (e.g., microwave spike may include one radiator extending between microwave antenna 120 and second end 114 of body 110). In other embodiments, a plurality of reradiating antennas 140 together span the entire length of body 110 (e.g., between microwave antenna 120 and second end 114 of body 110, etc.).

In one embodiment, transmission line 130 is leaky and complements a discrete microwave antenna 120. In one embodiment, microwave power is transferred into the item to be heated directly from transmission line 130 rather than from a particular heating component (i.e., transmission line 130 itself acts as the heating component, etc.). By way of example, transmission line 130 may be nonradiating (e.g., emit evanescent waves, etc.) or may be radiating (e.g., emit real waves, etc.). Radiating transmission lines 130 may heat a larger volume of the item to be heated than transmission lines 130 that are nonradiating.

When positioned in a microwave oven, incident microwaves from the microwave source contact the outer surface of the item to be heated and penetrate to a skin depth. According to one embodiment, transmission line 130 spatially distributes the power absorbed by microwave antenna 120 into an item to be heated (i.e., transmission line 130 may distribute power at one or more locations between first end 112 and second end 114 of body 110, etc.). Microwave antenna 120 absorbs microwave power, which is conveyed along transmission line 130 (e.g., where the power is emitted by a nonradiating transmission line 130, by a radiating transmission line 130, conveyed to reradiating antenna 140, etc.). Microwave spike 100 distributes power into the item to be heated along (e.g., adjacent, near, proximate, etc.) at least one of transmission line 130 and reradiating antenna 140. Microwave spike 100 having a transmission line 130 that spatially distributes power more uniformly heats an item to be heated relative to a conventional microwave system or a system configured to reradiate power only at an innermost end. Such benefits are magnified when microwave spike 100 is used to heat an item having a large thickness (e.g., a turkey, a chicken, a brick of frozen food, etc.) where even inner reradiation may still non-uniformly heat the item to be heated (e.g., an outer skin depth and middle portion may be heated whereas a thickness there between may be undercooked, etc.). In one embodiment, the position of reradiating antennas 140 further facilitates uniform heating of the item to be heated.

Reradiating antenna 140 may generate microwaves having various characteristics (e.g., phase, amplitude, etc.) and having values that are different than those collected by microwave antenna 120. In one embodiment, reradiating antenna 140 includes a limiter configured to limit the amplitude or power of the microwaves generated by reradiating antenna 140. In another embodiment, reradiating antenna includes a shifter configured to vary the phase of the microwaves generated by reradiating antenna 140 (e.g., relative to those collected by microwave antenna 120, etc.). In still other embodiments, reradiating antenna 140 includes both a limiter and a shifter (e.g., the shifter may vary the phase of the microwaves generated by reradiating antenna 140 once the power exceeds 10 Watts or another threshold value, etc.). The microwaves generated by reradiating antenna 140 may be tuned (e.g., tuned in phase, etc.) to heat according to a target profile. In one embodiment, the microwaves generated by reradiating antenna 140 are tuned to cooperate with (e.g., have a phase or other characteristic, etc.) the microwaves within the microwave oven. The microwaves may cooperate within the item to be heated thereby producing a cooperative heating effect that improves heating to a level beyond that associated with the microwaves within the microwave oven or the microwaves from reradiating antenna 140. In another embodiment, microwave spike 100 includes a plurality of reradiating antennas 140 configured to emit microwaves that interact to produce a cooperative heating effect. By way of example, microwave spike 100 may be fork-shaped and include reradiating antenna 140 at each tine of the fork. Reradiating antenna 140 at the tines may emit microwaves having a corresponding characteristic (e.g., phase, etc.) such that the microwaves constructively interfere between the tines to produce a cooperative (e.g., enhanced, etc.) heating effect.

According to one embodiment, microwave spike 100 includes a frequency shifter (e.g., a non-linear circuit, a variable load, a vector modulating circuit, etc.) coupled to reradiating antennas 140 radiator 140 such that the microwaves generated by reradiating antennas 140 have a different frequency than those produced by the microwave oven. According to another embodiment, microwave spike 100 includes a rectifier configured to convert incident microwaves into nominally DC current, which may drive another microwave source to produce microwaves at a target frequency. In other embodiments, microwave spike 100 includes a frequency multiplier (e.g., a frequency tripler, etc.) coupled to reradiating antenna 140 such that the microwaves generated by reradiating antennas 140 have a frequency that is a multiple of those within the microwave oven (e.g., at a harmonic, etc.). The frequency of the microwaves generated by reradiating antennas 140 may be greater or smaller than the frequency of the microwave field in the microwave oven. In other embodiments, the microwave field of the microwave oven includes microwaves at a plurality of wavelengths, and reradiating antenna 140 includes a frequency mixer configured to generate a sum or a difference frequency. Reradiating antenna 140 may produce microwaves at the sum frequency or at the difference frequency. Microwave spike 100 may alter the frequency of the waves generated by reradiating antennas 140 to change the absorptivity characteristics of the reradiated waves (e.g., waves having a longer wavelength may penetrate the food surface a greater distance, etc.).

In some embodiments, the microwaves generated by each reradiating antenna 140 of microwave spike 100 have the same characteristics. In other embodiments, at least one reradiating antenna 140 generates microwaves having different characteristics. By way of example, reradiating antennas 140 positioned closer to second end 114 of body 110 may generate microwaves having a different wavelength than those closer to first end 112 of body 110.

Referring next to the embodiment shown in FIGS. 6-9, microwave spike 100 includes a heating component, shown as load 150, that is configured to convert power into heat, which is transferred into the item to be heated by conduction. According to one embodiment, load 150 is coupled to transmission line 130. Power may be absorbed by microwave antenna 120 and conveyed along transmission line 130 where it interacts with load 150 to generate heat. In some embodiments, load 150 is a dielectric material. Power absorbed by microwave antenna 120 may generate dielectric heating within load 150 (i.e., the at least partially electrical insulating material is heated due to dielectric loss, etc.). Power dissipated by load 150 may be transferred (e.g., due to a conductive heat transfer mechanism, etc.) into the item to be heated.

Figure 6:
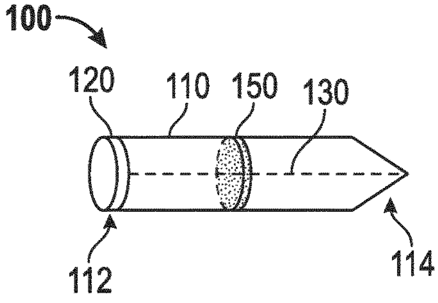
FIG. 6 is an elevation view of a microwave heating element having a load heating component, according to one embodiment.
Figure 7:
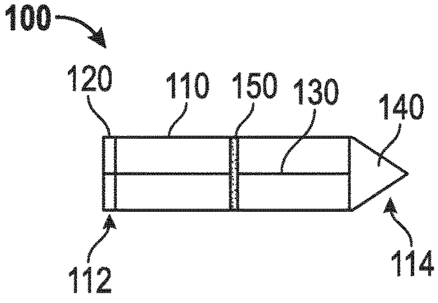
FIG. 7 is a sectional view of a microwave heating element having a load heating component, according to one embodiment.
Figure 8:
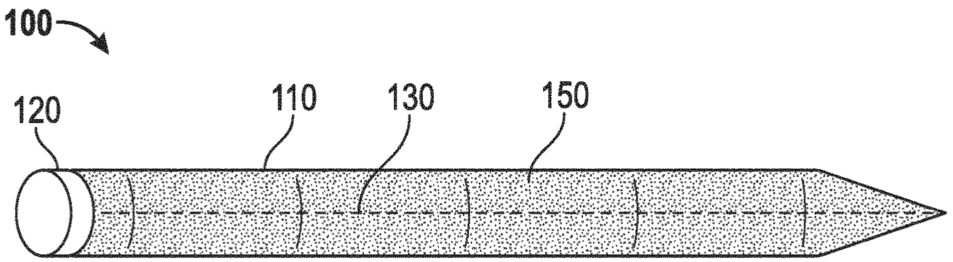
FIG. 8 is an elevation view of a microwave heating element having a distributed heating component, according to one embodiment.
Figure 9:
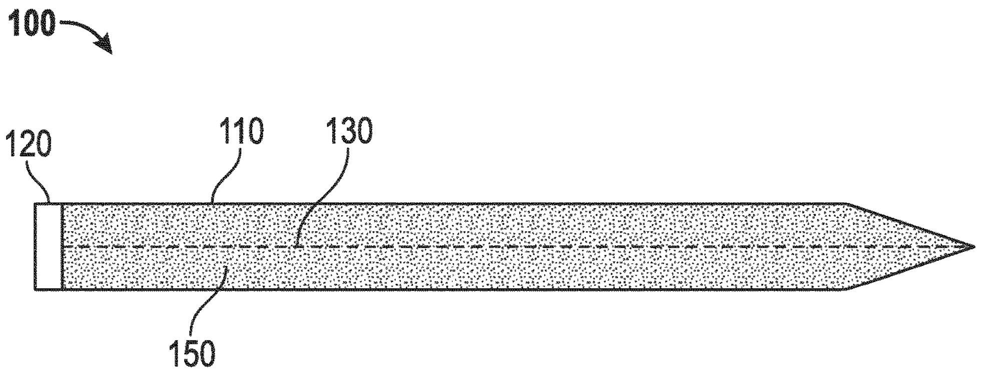
FIG. 9 is a sectional view of a microwave heating element having a distributed heating component, according to one embodiment.

According to the embodiment shown in FIGS. 6-7, load 150 is disk-shaped and extends along a portion of body 110. According to the embodiment shown in FIGS. 8-9, load 150 fills a void space within microwave spike 100. As shown in FIGS. 8-9, body 110 is a tubular component having a sidewall. The sidewall defines an outer surface configured to interface with the item to be heated and an inner surface configured to engage (e.g., contact, contain, etc.) load 150. Load 150 may be disposed between transmission line 130 and body 110. In some embodiments, power flowing through transmission line 130 heats load 150, which in turn heats body 110 to transfer energy into the item to be heated. Load 150 may extend along a portion of transmission line 130, as shown in FIGS. 6-7, or may extend along the entire length of transmission line 130, as shown in FIGS. 8-9.

According to one embodiment, load 150 is at least partially a material having a Curie temperature, such as a ferroelectric or ferromagnetic (ferrite) material. Load 150 may be configured to interact differently with microwave power above and below its Curie temperature (e.g., by absorbing microwave power below its Curie temperature and transmitting or reflecting microwave power above its curie temperature, etc.). Load 150 manufactured from a material having a Curie temperature may have different characteristics (e.g., resistivity or permittivity, electrical conductivity, etc.) at temperatures above and below the Curie temperature. By way of example, iron, chromium (iv) oxide, and gadolinium have Curie temperatures of 1417, 235, and 65 degrees Fahrenheit, respectively. Load 150 manufactured from gadolinium, for example, may dissipate power into the item to be heated at temperatures below 65 degrees Fahrenheit and thereafter stop dissipating power into the item to be heated as load 150 reaches a temperature above 65 degrees Fahrenheit (e.g., due to power dissipated by load 150, due to power transfer from the item to be heated, etc.).

Microwave spikes 100 including loads 150 manufactured from a material having a Curie temperature may be tuned to meet the heating requirements of a particular item to be heated or application. By way of example, for applications of defrosting meats, load 150 may be manufactured from gadolinium such that power is dissipated into the item to be heated at temperatures below 65 degrees Fahrenheit without dissipating power into the item to be heated at temperatures above 65 degrees Fahrenheit thereby reducing the risk of cooking, rather than defrosting, the meat. Where load 150 is manufactured from a material having a Curie temperature, the heating of the item to be heated is directly controlled by the composition of the material. In still other embodiments, microwave spike 100 may transmit power deeper into the item to be heated as one or more loads 150 reach their Curie temperatures (e.g., loads 150 may have different, location specific Curie temperatures, etc.). Microwave spike 100 may reflect energy (i.e., send the energy back to the input, etc.) if each load 150 has reached its respective Curie temperature.

In other embodiments, load 150 is coupled to transmission line 130 with a connector. The connector may be an annular ring positioned between transmission line 130 and load 150 (e.g., where load 150 extends around a periphery of body 110, etc.) or may be a blade coupling (e.g., electrically coupling transmission line 130 with load 150, etc.). In some embodiments, the connector is manufactured from a conductive material. According to one embodiment, the conductive material has a Curie temperature to selectively couple load 150 with transmission line 130. By way of example, load 150 may be manufactured from a dielectric material, and the connector may be manufactured from chromium (iv) oxide such that load 150 is coupled to transmission line 130 and dissipates power at temperatures below 235 degrees Fahrenheit and "turns off," disengages, or decouples load 150 from transmission line 130 once the connector reaches 235 degrees Fahrenheit. According to one embodiment, reradiating antenna 140 is coupled to transmission line 130 with a connector. The connector may be manufactured from a material having a Curie temperature to selectively couple reradiating antenna 140 with transmission line 130.

According to an embodiment, the heating component is selectively coupled to the transmission line with a thermo sensitive device (e.g., a thermistor, a mechanical device coupled to a thermal switch, etc.). The thermo sensitive device may include a thermal actuator (e.g., a bimetallic composition, a memory metal, a thermal wax, etc.), a mechanical actuator, or still another type of actuator. According to one embodiment, the thermo sensitive device is a switch configured to couple the heating component to transmission line 130 when in a "closed" position and decouple the heating component from the transmission line when in an "open" position. Microwave spike 100 may include a timer coupled to the switch. The timer may move the switch from the closed position to the open position after a predetermined period of time. The timer allows for the controlled transfer of power into the item to be heated by allowing a user to set a "cook time" for at least one of the heating components. According to an embodiment, microwave spike includes a processor having a timer module configured to provide a timer signal. The timer module may provide the timer signal after a predetermined period of time, at a certain time, or under still other conditions. The processor may disengage the switch in response to the timer signal thereby preventing the transfer of power into the item to be heated from the heating component.

According to one embodiment, the heating component is cylindrical and has a circular cross-sectional shape. A cylindrical heating component uniformly distributes power from the microwaves of the microwave oven into the item to be heated. In other embodiments, the heating component may be otherwise shaped (e.g., having an oval-shaped cross-section, a blade having a rectangular cross-sectional shape, etc.) to non-uniformly distribute power into the item to be heated. Microwave spike 100 may have a heating component shaped to distribute power across a larger width to heat wide items (e.g., wide food products, etc.) or across a narrow width to heat narrow items (e.g., narrow food products, etc.), among other alternatives. The heating component may be positioned at an end of the transmission line opposite the antenna or may be positioned at a particular location along the length of the transmission line thereby forming a heating port (i.e., a localized source of power transfer into the item to be heated, etc.). In one embodiment, the heating component is distributed along a length (e.g., the entire length, a portion of the length, etc.) of the transmission line.

Figure 10:
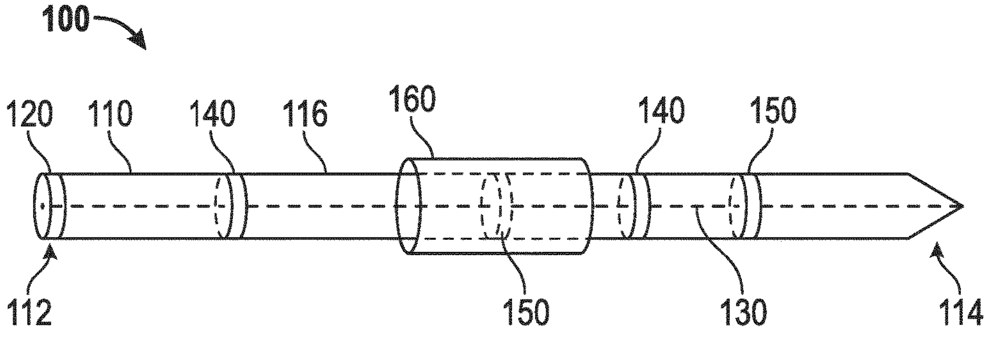
FIG. 10 is an elevation view of a microwave heating element including a mechanical control mechanism, according to one embodiment.

Referring next to the embodiment shown in FIG. 10, microwave spike 100 includes a mechanical control mechanism, shown as collar 160. Collar 160 is movable between a plurality of positions to selectively control the distribution of power emitted by microwave spike 100, according to one embodiment. By way of example, collar 160 may prevent the transfer of power from at least a portion of the length of spike 100 into food product 40. According to another embodiment, collar 160 is configured to control the emission of thermal power (e.g., collar 160 may be an insulator or a metallic conductor, etc.). In one embodiment, collar 160 is tubular and movably coupled to body 110. As shown in FIG. 10, body 110 includes a cylindrical portion 116 having a shape to accommodate the inner diameter of collar 160. Collar 160 may also include a latch or other retainer configured to limit unintended movement of collar 160 relative to microwave spike 100 (e.g., during insertion, etc.). As shown in FIG. 10, microwave spike 100 includes reradiating antennas 140 and loads 150 coupled to transmission line 130. A user may slide the inner diameter of collar 160 over the outer diameter of body 110 to prevent transfer of power from at least one of reradiating antenna 140 and load 150 into food product 40. Thereafter, the user may insert microwave spike 100 into the item to be heated with the collar 160 intact. Collar 160 may include a conductive mesh configured to prevent the microwaves generated by reradiating antennas 140 from passing into the item to be heated. In other embodiments, collar 160 includes a thermal insulator to reduce the dissipation of power from load 150 into the item to be heated. According to still another embodiment, collar 160 includes both a conductive mesh and a thermal insulator. The mechanical control mechanism may alternatively include a cover or window at least one of slidably and rotatably coupled to body 110. When in an open position, power may be transferred from transmission line 130 into the item to be heated through an aperture in body 110. In a closed position, the cover or window may be disposed over the aperture thereby preventing power flow into the item to be heated.

Figure 11:
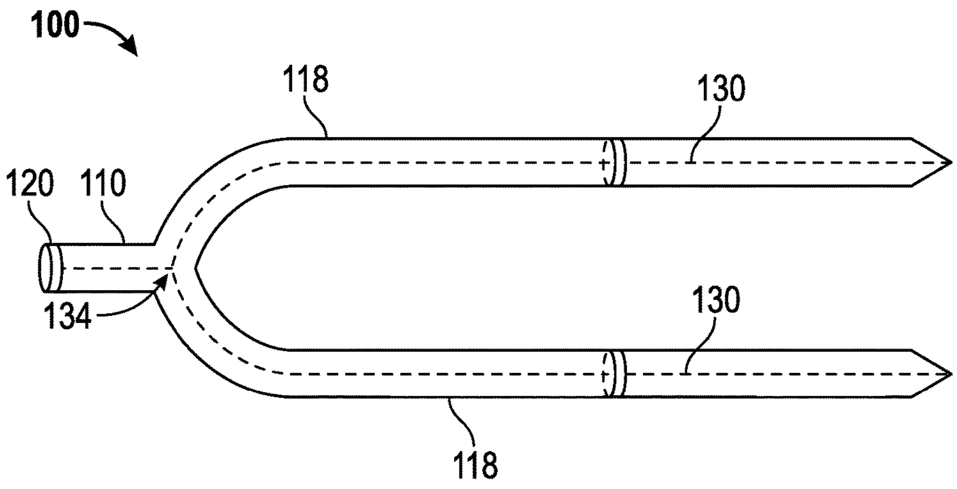
FIG. 11 is an elevation view of a microwave heating element including a body having two branches, according to one embodiment.

According to the embodiment shown in FIG. 11, microwave spike 100 is fork-shaped and includes a first branch 118 and a second branch 118. A fork-shaped microwave spike 100 further distributes the power absorbed by microwave antenna 120 during operation of the microwave oven. According to one embodiment, transmission line 130 branches at point 134 into a first portion that extends into the first branch 118 and a second portion that extends into the second branch 118. The first portion and the second portion of transmission line 130 are thereby coupled at point 134, and power from the microwaves absorbed by microwave antenna 120 travels to point 134 where it is split between the two branches 118. In other embodiments, microwave spike 100 includes more than two branches. The relative phase of the emission from the two or more branches may be controlled to determine the pattern of the field around microwave spike 100 and therefore the pattern of power distribution around microwave spike 100. By way of example, the relative phases may be aligned such that there is a maximum power deposition between the spikes or misaligned to reduce deposition between the spikes. Aligning or misaligning the phases may compensate for the hot spots created by the microwave spike 100.

According to one embodiment, a first transmission line extends from microwave antenna 120 into the first branch 118 and a second transmission line extends from microwave antenna 120 into the second branch 118. Such a configuration eliminates the common portion of transmission line 130, which may otherwise limit the flow of energy into the first portion and the second portion of transmission line 130. In other embodiments, the common portion of transmission line 130 is sized to accommodate a maximum designed power flow. In still other embodiments, microwave spike 100 includes a first transmission line extending from a first microwave antenna 120 into first branch 118 and a second transmission line extending from a second microwave antenna 120 into second branch 118. As shown in FIG. 11, the first branch and the second branch are fixed to a common portion of body 110. In other embodiments, at least one of the first branch 118 and the second branch 118 form a second housing that extends outward from a portion of body 110. The second housing may be coupled to the first housing with a driver that is positioned to extend the second housing from the first housing (e.g., along the length of the first housing, laterally from the first housing, etc.).

Figure 12:
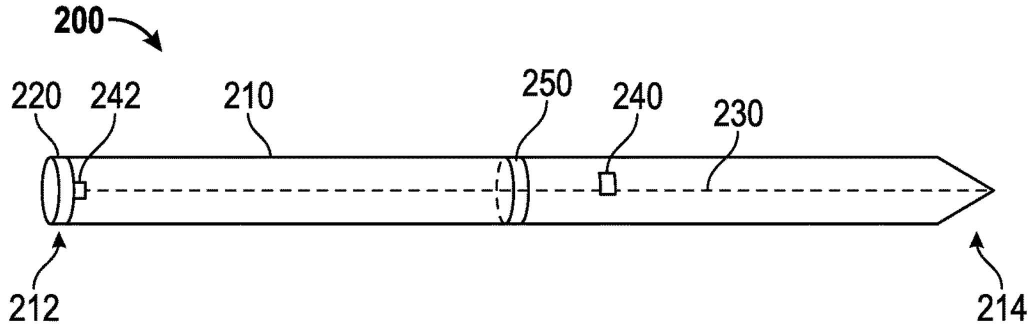
FIG. 12 is an elevation view of a microwave heating element including a sensor and a switch, according to one embodiment.

Referring next to the embodiment shown in FIG. 12, a microwave heating element, shown as microwave spike 200 includes a housing, shown as body 210, extending between a first end 212 and a second end 214. Microwave spike 200 further includes a microwave antenna, shown as microwave antenna 220, coupled to a transmission line, shown as transmission line 230. Microwave antenna 220 is coupled to first end 212 of body 210 and is configured to absorb power from a microwave field in a microwave oven. Second end 214 of body 210 is configured to be inserted into an item to be heated.

Microwave spike 200 further includes a sensor 240 positioned to detect a property of the item to be heated. According to one embodiment, the property of the item to be heated is temperature. In other embodiments, the property of the item to be heated is moisture content or still another feature. Microwave spike 200 having sensor 240 may reduce the risk of overcooking, drying out, or otherwise adversely heating the item to be heated. Transmission line 230 distributes the power of microwaves in a microwave oven into the item to be heated based on the property of the item to be heated. Such distribution of power may occur through reradiation or dissipation. As shown in FIG. 12, a heating component 250 is coupled to transmission line 230 and positioned to transfer power into the item to be heated. According to one embodiment, transmission line 230 distributes power from microwaves absorbed by microwave antenna 220 into the item to be heated through heating component 250. Such transfer may occur only when the property of the item to be heated is one of above or below the threshold value (e.g., above a moisture content of twenty percent, below 200 degrees Fahrenheit, etc.). In other embodiments, the sensor 240 detects another property of the item to be heated.

As shown in FIG. 12, sensor 240 is positioned to detect the property of the item to be heated along heating component 250. Body 210 may be manufactured from a thermal insulator to prevent heat generated by heating component 250 from interfering with the reading of sensor 240. In some embodiments, heating component 250 is a radiator and does not heat body 210. According to one embodiment, sensor 240 is coupled to another portion of body 210 (e.g., at second end 214, etc.) to detect the property of the item to be heated in a location spaced from heating component 250. In still other embodiments, sensor 240 may be remotely positioned (e.g., a separate probe, etc.) and coupled to microwave spike 200 with a lead.

Referring still to the embodiment shown in FIG. 12, microwave spike 200 includes a switch 242 coupling transmission line 230 with microwave antenna 220. Sensor 240 may be a thermostat coupled to switch 242 (e.g., electrically coupled with a pair of wires, physically coupled to switch 242, etc.) or another type of sensor configured to detect another property of the item to be heated. In operation of microwave spike 200, microwave antenna 220 absorbs microwaves, power initially passes through switch 242, the power is conveyed by transmission line 230, and power is transferred into the item to be heated by heating component 250. Once the thermostat detects a temperature of the item to be heated that exceeds the threshold value, the thermostat disengages switch 242 thereby decoupling transmission line 230 and heating component 250 from microwave antenna 220 to prevent further heating of the item to be heated. Selectively coupling transmission line 230 with microwave antenna 220 allows for the simultaneous control of several heating components 250 (e.g., as part of a coordinated control strategy, etc.). In other embodiments, switch 242 couples transmission line 230 with heating component 250, and the thermostat disengages switch 242 thereby decoupling heating component 250 from transmission line 230 as the temperature exceeds the threshold value. Selectively coupling heating component 250 to the transmission line 230 allows for the individual control of heating components 250.

According to one embodiment, microwave spike 200 includes an electronic control system, and sensor 240 is configured to produce a sensor signal relating to the property of the item to be heated. Microwave spike 200 may include a processor configured to evaluate the sensor signal and disengage a switch as the property of the item to be heated reaches the threshold value. The processor may be an analog or digital control mechanism or a transistor control mechanism such that the switch is operable between a plurality of operating conditions including “on” and “off.” In some embodiments, the switch couples microwave antenna 220 with transmission line 230. In other embodiments, the switch couples transmission line 230 with a heating component 250. By way of example, sensor 240 may be a moisture content sensor configured to sense the electrical conductivity across a pair of leads. Sensor 240 may provide a differential voltage or a signal relating to the moisture content to the processor for evaluation. In one embodiment, sensor 240 and the processor or other electronics are powered by microwave power (e.g., suitably rectified and filtered power, etc.). In another embodiment, sensor 240 and the processor or other electronics are powered via a battery disposed within microwave spike. In still other embodiments, sensor 240 and the processor or other electronics are powered via a cable connected from spike 200 to an external power source.

According to one embodiment, the processor operates according to an open loop control scheme whereby the switch remains disengaged and heating is discontinued until the switch is reset (e.g., by a user). According to another embodiment, the processing circuit operates according to a closed loop control scheme whereby the sensor signal is monitored. As the property again rises above or falls below the threshold value, the processing circuit may send a signal to actuate the switch into the closed position thereby reengaging the heating component. By way of example, the sensor may monitor the temperature of the item to be heated, which may initially surpass the threshold value and thereafter fall below the threshold value. The processing circuit may evaluate the sensor signal, determine that the temperature of the item to be heated has fallen below the threshold value, and close the switch to reengage the heating component.

Figure 13:
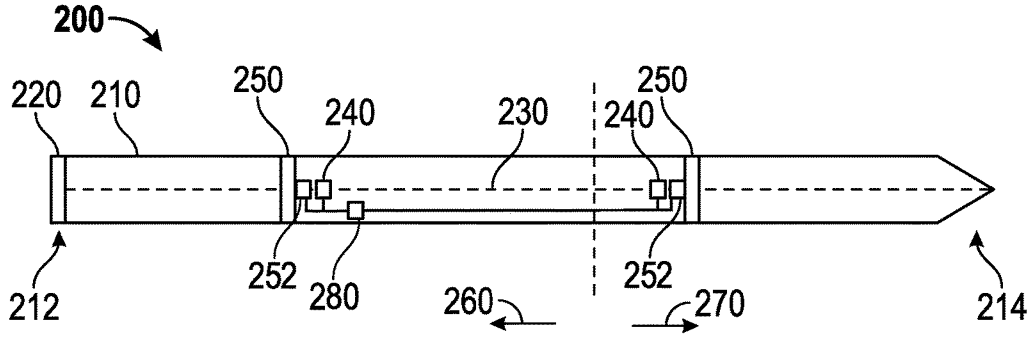
FIG. 13 is an elevation view of a microwave heating element including heating components and sensors within separate heating zones, according to one embodiment.

Referring next to FIG. 13, body 210 of microwave spike 200 includes a first heating component 250 coupled to transmission line 230 with a first switch 252 and a second heating component 250 coupled to transmission line 230 with a second switch 252. According to one embodiment, a first heating zone 260 and a second heating zone 270 are defined along transmission line 230. Separate heating zones allow for the individual control of heating components thereby allowing for the individual control of different portions of microwave spike 200. According to one embodiment, microwave spike 200 operates according to a control scheme that turns off one heating component 250 (e.g., a heating component positioned closer to the outer surface of an item to be heated) while leaving at least one heating component 250 turned on. While two heating zones are discussed herein, microwave spike 200 may alternatively include a plurality of heating zones. Each heating zone may have separate components, or the components may operate as part of a coordinated control scheme, according to various embodiments.

As shown in FIG. 13, a first sensor 240 and a first heating component 250 are positioned within first heating zone 260 while a second sensor 240 and a second heating component 250 are positioned within second heating zone 270. According to one embodiment, first sensor 240 and second sensor 240 are configured to provide a first sensor signal and a second sensor signal, respectively. The first sensor signal relates to a property of the item to be heated (e.g., temperature, moisture content, etc.) along the first heating zone whereas the second sensor signal relates to the property of the item to be heated along the second heating zone. In some embodiments, a processor 280 is configured to evaluate the first sensor signal and the second sensor signal, disengage the first switch 252 as the property of the item to be heated along the first heating zone reaches the threshold value, and disengage the second switch 252 as the property of the item to be heated along the second heating zone reaches the threshold value.

According to one embodiment, microwave spike 200 includes a first transmission line 230 coupling the first heating component 250 with the microwave antenna 220 and a second transmission line 230 coupling the second heating component 250 with microwave antenna 220. The first transmission line and the second transmission line are coupled to microwave antenna 220 with a first switch and a second switch, respectively. The processor may alternatively disengage the first switch or the second switch as the property of the item to be heated exceeds the threshold value. Having separate transmission lines for different heating zones facilitates simultaneously disengaging several heating components (e.g., where microwave spike 200 includes several heating components 250 positioned within at least one heating zone, etc.).

Microwave spike 200 having different heating zones further reduces the risk of overcooking, drying out, or otherwise adversely heating the item to be heated. By way of example, the item to be heated may have an initial temperature of forty degrees Fahrenheit, and microwave spike 200 may be inserted inward toward a center portion of the item to be heated. In such a configuration, first heating zone 260 is oriented along an outer portion of the item to be heated whereas second heating zone 270 is inward toward the center portion of the item to be heated. Engagement of the microwave oven directs a microwave field toward the item to be heated, which heats the outer portion of the item to be heated, and power absorbed by microwave antenna 220 is transmitted into the outer portion and the inner portion of the item to be heated by first heating component 250 and second heating component 250, respectively. Continued operation of both heating components 250 until the inner portion reaches a preferred heating level may overcook, dry out, or otherwise adversely heat the outer portion (e.g., due to combined heating from the first heating component 250 and the microwave field within the microwave oven, etc.). A microwave spike 200 that includes multiple heating zones may disengage the first heating component thereby reducing the discrepancy in heating and reducing the risk of adversely heating the outer portion.

Figure 14:
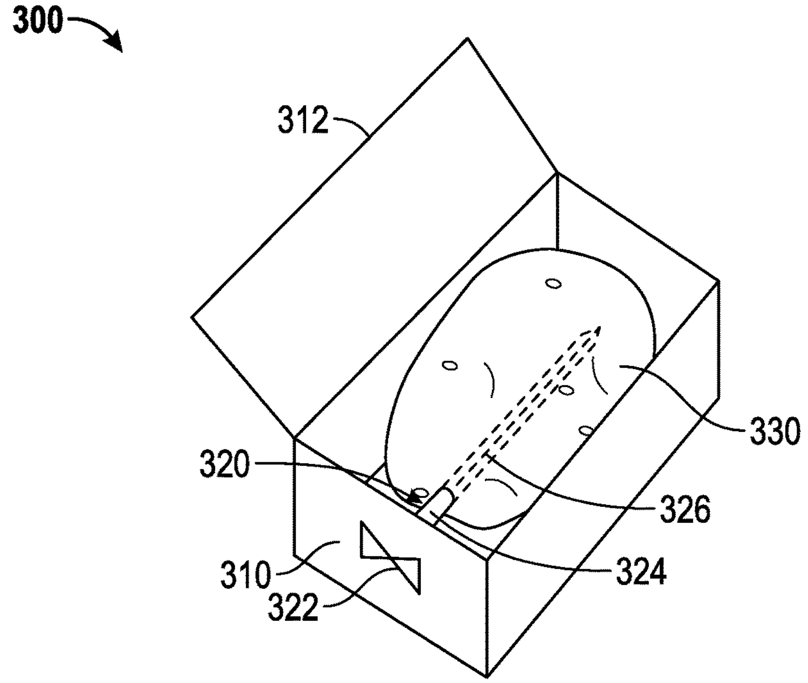
FIG. 14 is an elevation view of a food packaging assembly that includes a microwave heating element, according to one embodiment.

Referring next to the embodiment shown in FIG. 14, a food packaging assembly, shown as package 300, includes a container, shown as box 310, and a microwave heating element, shown as microwave spike 320. Package 300 may be sold to a supplier or a consumer as an assembly including both box 310 and microwave spike 320. The combination of microwave spike 320 and box 310 is intended to reduce the requisite processing time for an item to be heated and reduce the risk of overcooking, drying out, or otherwise adversely heating the item to be heated therein. Such an assembly may be placed into a microwave oven and heated. In some embodiments, the item to be heated is a ready-made meal, frozen casserole, or a liquid item to be heated (e.g., a container of soup), among other alternatives.

According to one embodiment, box 310 includes a plurality of sidewalls and a cover 312. As shown in FIG. 14, box 310 is configured to receive an item to be heated, shown as food product 330, therein. The item to be heated may alternatively be another type of food (e.g., a chicken breast, a turkey, a casserole, a squash, etc.) or another material (e.g., wax, water, etc.).

As shown in FIG. 14, microwave spike 320 is coupled to box 310 (e.g., a sidewall of box 310 includes an aperture that receives a portion of microwave spike 320, etc.) and configured to be positioned at least partially within food product 330. Microwave spike 320 includes a microwave antenna, shown as microwave antenna 322, a housing, shown as body 324, having an end coupled to microwave antenna 322, and a transmission line, shown as transmission line 326. Transmission line 326 is positioned within body 324 and has an end that is coupled to microwave antenna 322. Transmission line 326 spatially distributes the power of a microwave field into food product 330 during operation of a microwave oven.

In some embodiments, transmission line 326 is a wave guide. In other embodiments, microwave spike 320 includes a heating component (e.g., a radiator, a load, etc.). According to one embodiment, the waveguide or heating component has properties intended to correspond with the characteristics of the particular food product 330 within box 310. By way of example, the heating component may be a load manufactured from a material having a Curie temperature that corresponds to a desired cooking temperature for food product 330. Relating a property of the waveguide or heating component to food product 330 is intended to reduce the risk of overcooking, drying out, or otherwise overheating food product 330. In other embodiments, microwave spike 320 includes various additional components (e.g., switches, sensors, processors, etc.) intended to interface with the transmission line and reduce the risk of overcooking, drying out, or otherwise overheat food product 330. Such features reduce the amount of supervision required of a user while food product 330 within a microwave oven (e.g., sensors may be used to disengage transmission line 326 or at least one heating component, etc.).

Figure 15:
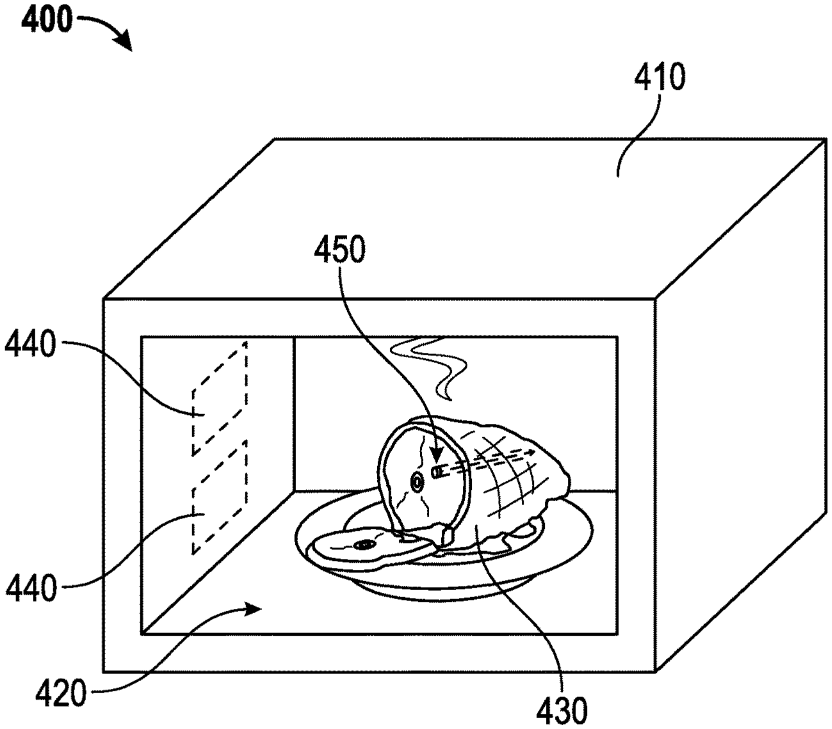
FIG. 15 an isometric view of a microwave heating system having microwave sources that produce microwaves having different frequencies, according to one embodiment.

Referring next to the embodiment shown in FIG. 15, a microwave cooking system, shown as microwave oven 400, includes a plurality of walls 410 that define an inner cavity 420. Inner cavity 420 is configured to receive an item to be heated 430 therein. Microwave oven 400 further includes a microwave source 440 configured to produce a microwave field. According to the embodiment shown in FIG. 15, microwave oven 400 includes a first microwave source 440 configured to produce a first microwave field and a second microwave source 440 configured to produce a second microwave field. Microwaves having different frequencies penetrate items to be heated to different skin depths. According to one embodiment, microwave oven 400 reduces cooking time and the risk of overcooking, drying out, or otherwise overheating by heating the outer portion of item to be heated 430 with microwaves within a first frequency band and heating the inner portion of the item to be heated with microwaves within a second frequency band. In other embodiments, microwave oven 400 includes a single microwave source configured to provide microwaves at a plurality of frequency bands (e.g., a single magnetron configured to oscillate at two different frequencies, etc.).

As shown in FIG. 15, a microwave heating element, shown as microwave spike 450, is inserted into item to be heated 430 and positioned within inner cavity 420 during operation of microwave oven 400. According to one embodiment, microwave spike 450 includes a microwave antenna positioned outside item to be heated 430 and tuned to absorb microwaves at the second frequency. Microwaves produced by the microwave source having other frequencies (e.g., the first frequency, etc.) are not absorbed by the microwave antenna. Power from the absorbed microwaves is conveyed along a transmission line and transferred into item to be heated 430. A heating component (e.g., a radiator, a load, etc.) may be coupled to the transmission line to facilitate such a transfer of power into item to be heated 430. Microwave spike 450 having a microwave antenna tuned to absorb microwaves at a single frequency heats the interior of an item to be heated with microwaves having a particular frequency, which may have a preferred power relative to microwaves produced by microwave source 440 at a different frequency. Heating the interior portion of item to be heated 430 with microwaves having a larger power reduces the total time required to heat item to be heated 430. The frequency that the microwave antenna absorbs may be selected based on a particular item to be heated 430 (e.g., a higher frequency to heat thin chicken breasts, a lower frequency to heat thick pieces of meat or a casserole, etc.).

According to one embodiment, the first frequency and the second frequency are within different frequency bands (e.g., a frequency band centered at 915 MHz, a frequency band centered at 2.45 GHz, etc.). According to another embodiment, the first frequency and the second frequency are within the same frequency band. By way of example, the first frequency may be 2.451 GHz and the second frequency may be 2.452 GHz, and the microwave antenna may be tuned to absorb only one of the two frequencies. The first frequency may be a precise frequency or may be a frequency range and the second frequency may be a precise frequency or a frequency range (e.g., the antenna may be tuned to absorb microwaves having frequencies within a frequency band centered at 915 MHz but not microwaves having frequencies within a frequency band centered at 2.45 GHz, etc.).

According to another embodiment, a plurality of microwave spikes 450 are inserted into item to be heated 430. Each microwave spike 450 may include a microwave antenna tuned to absorb microwaves at a particular frequency. Microwave source 440 produces microwaves at a first frequency, which are absorbed by a first microwave spike 450, and microwaves at a second frequency, which are absorbed by a second microwave spike 450. Microwave spikes 450 may include microwave antennas having absorption characteristics selected based upon the portion of item to be heated 430 into which a user will insert microwave spike 450. By way of example, a microwave spike for insertion into a turkey thigh may be designed to absorb and convey power from microwaves at a first frequency (e.g., 2.45 GHz, etc.) whereas a microwave spike for insertion into a turkey breast may be designed to absorb and convey power from microwaves at a second frequency (e.g., 915 MHz, etc.). Such tuned microwave spikes are intended to more uniformly heat the item to be heated. While two microwave spikes 450 have been described, more than two microwave spikes 450 may be inserted into an item to be heated of other material. Microwave spikes 450 may be arranged in an array, randomly, or positioned based on the features (e.g., thickness, composition, etc.) of the item to be heated.

While various aspects and embodiments have been disclosed herein, other aspects and embodiments will be apparent to those skilled in the art. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Accordingly, all such modifications are intended to be included within the scope of the present inventions. The order or sequence of any process or method steps may be varied or re-sequenced according to other embodiments. The various aspects and embodiments disclosed herein are for purposes of illustration and are not intended to be limiting, with the true scope and spirit being indicated by the following claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:

1. A microwave heating element, comprising:

a microwave antenna configured to absorb power from a microwave field in a microwave oven;

a sensor positioned to detect a property of an item to be heated, wherein the sensor is configured to provide a sensor signal relating to the property of the item to be heated;

a transmission line having an end coupled to the microwave antenna, wherein the transmission line is configured to distribute the power absorbed from the microwave field into the item to be heated based on the property of the item to be heated;

a heating component coupled to the transmission line with a switch, wherein the heating component is configured to transfer power from the microwave field into the item to be heated in response to engagement of the switch; and a processor configured to evaluate the sensor signal and disengage the switch as the property of the item to be heated reaches a threshold value.

2. The microwave heating element of claim 1, wherein the property is a temperature, the sensor comprising a thermostat configured to disengage the heating of the heating component as the temperature of the item to be heated reaches a threshold value.

3. The microwave heating element of claim 1, wherein the heating component includes a load configured to dissipate power into the item to be heated as heat.

4. The microwave heating element of claim 3, the load comprising a material having a Curie temperature.

* * * * *